US012731287B2

(12) United States Patent
Choi et al.

(10) Patent No.: US 12,731,287 B2
(45) Date of Patent: Sep. 8, 2026

(54) VEHICLE LOCATION CALCULATION APPARATUS AND VEHICLE LOCATION CALCULATION METHOD

(71) Applicants: Hyundai Motor Company, Seoul (KR); Kia Corporation, Seoul (KR)

(72) Inventors: Jonghyun Choi, Seoul (KR); Junsik An, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 325 days.

(21) Appl. No.: 18/384,021

(22) Filed: Oct. 26, 2023

(65) Prior Publication Data

US 2024/0193811 A1 Jun. 13, 2024

(30) Foreign Application Priority Data

Dec. 8, 2022 (KR) ........................ 10-2022-0170479

(51) Int. Cl.
*G06T 7/73* (2017.01)
*G06T 7/60* (2017.01)
(Continued)

(52) U.S. Cl.
CPC .................. *G06T 7/75* (2017.01); *G06T 7/60* (2013.01); *G06V 10/7715* (2022.01);
(Continued)

(58) Field of Classification Search
CPC ... G06T 7/75; G06T 7/60; G06T 2207/20081; G06T 2207/30244; G06T 2207/20084;
(Continued)

(56) References Cited

U.S. PATENT DOCUMENTS

| | | | |
|---|---|---|---|
| 9,569,685 | B2 | 2/2017 | Jung et al. |
| 10,635,917 | B1 | 4/2020 | Kim et al. |

(Continued)

FOREIGN PATENT DOCUMENTS

| | | | | |
|---|---|---|---|---|
| CN | 112036389 A | * 12/2020 | | ............. G06F 18/24 |
| CN | 112132013 A | 12/2020 | | |
| CN | 112489126 A | 3/2021 | | |
| JP | 2018-045405 A | 3/2018 | | |
| JP | 2021-029037 A | 2/2021 | | |
| KR | 2010-0026123 A | 3/2010 | | |
| KR | 2016-0007977 A | 1/2016 | | |
| KR | 2020-0094642 A | 8/2020 | | |

OTHER PUBLICATIONS

Reddy, N. D., Vo, M., & Narasimhan, S. G. (2019). Occlusion-net: 2d/3d occluded keypoint localization using graph networks. In Proceedings of the IEEE/CVF conference on computer vision and pattern recognition (pp. 7326-7335) (Year: 2019).*

*Primary Examiner* — Xiao Liu
*Assistant Examiner* — Vaisali Rao Koppolu
(74) *Attorney, Agent, or Firm* — MORGAN, LEWIS & BOCKIUS LLP

(57) ABSTRACT

A vehicle location calculation apparatus includes: a model learning part configured to perform learning to output an invisible keypoint set in a model image in which each vehicle is modeled, based on a visible keypoint set in the model image; and a dataset calculation part configured to generate a dataset including a visible keypoint and an invisible keypoint of a target vehicle, by inputting the visible keypoint of the target vehicle to the model learning part so that the invisible keypoint of the target vehicle is output, the visible keypoint of the target vehicle being detected in an image of the target vehicle while driving.

18 Claims, 8 Drawing Sheets

(51) Int. Cl.
*G06V 10/77* (2022.01)
*G06V 10/774* (2022.01)
*G06V 20/70* (2022.01)

(52) U.S. Cl.
CPC ............ *G06V 10/774* (2022.01); *G06V 20/70* (2022.01); *G06T 2207/20081* (2013.01); *G06T 2207/30244* (2013.01)

(58) Field of Classification Search
CPC . G06T 2207/20076; G06T 2207/30252; G06T 7/80; G06T 2207/30232; G06T 5/00; G06T 2219/004; G06V 10/7715; G06V 10/774; G06V 20/70; G06V 10/82; G06V 20/56; G06N 3/0499; G06N 3/08
See application file for complete search history.

(56) References Cited

U.S. PATENT DOCUMENTS

| | | | | |
|---|---|---|---|---|
| 2022/0139061 | A1* | 5/2022 | Wang | G06N 3/045<br>382/100 |
| 2022/0156985 | A1 | 5/2022 | Koguchi et al. | |
| 2022/0300738 | A1* | 9/2022 | Hu | G06V 20/64 |
| 2022/0301304 | A1* | 9/2022 | Hampali | G06N 3/045 |

* cited by examiner

VEHICLE LOCATION CALCULATION APPARATUS AND VEHICLE LOCATION CALCULATION METHOD

CROSS-REFERENCE TO RELATED APPLICATION

The present application claims priority to Korean Patent Application No. 10-2022-0170479, filed on Dec. 8, 2022, the entire contents of which is incorporated herein for all purposes by this reference.

BACKGROUND OF THE PRESENT DISCLOSURE

Field of the Present Disclosure

The present disclosure relates to a vehicle location calculation apparatus and a vehicle location calculation method.

DESCRIPTION OF RELATED ART

A surround view monitor (SVM) enables a user to view front, back, left and right sides through cameras provided on a vehicle. A deep learning-based image recognition means is capable of recognizing keypoints (feature points) of a target vehicle (object) in an image captured by the SVM camera.

Keypoint information may include a keypoint location (coordinates) in an image, information related to a portion of an object pointed to by each keypoint, image pixel values, and the like.

However, an existing keypoint extraction method may predict only visible keypoints of a target vehicle, leading to limited recognition of shape and location of the target vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle location calculation apparatus and a vehicle location calculation method which may effectively recognize a location of a vehicle by predicting invisible keypoints using visible keypoints of the vehicle.

Additional aspects of the present disclosure will be set forth in part in the description which follows, and in part, will be obvious from the description, or may be learned by practice of the present disclosure.

According to an aspect of the present disclosure, there is provided a vehicle location calculation apparatus, including: a model learning part configured to perform learning to output an invisible keypoint set in a model image in which each vehicle is modeled, based on a visible keypoint set in the model image; and a dataset calculation part configured to generate a dataset including a visible keypoint and an invisible keypoint of a target vehicle, by inputting the visible keypoint of the target vehicle to the model learning part so that the invisible keypoint of the target vehicle is output. The visible keypoint of the target vehicle is detected in an image of the target vehicle while driving.

The model learning part may include a correction part configured to correct the visible keypoint of the modeled vehicle to be similar to a visible keypoint of an image of an actual vehicle, and the model learning part may be configured to perform learning to output an invisible keypoint of the modeled vehicle by receiving a value of the correction as input.

The dataset calculation part may include a keypoint learning part configured to learn a visible keypoint in an image of an actual vehicle.

The dataset calculation part may further include a keypoint detection part configured to detect the visible keypoint of the target vehicle based on data regarding the visible keypoint data learned by the keypoint learning part.

The vehicle location calculation apparatus may further include a spatial coordinate calculation part configured to determine spatial coordinates of the target vehicle, based on the dataset including the visible keypoint and the invisible keypoint of the target vehicle.

The spatial coordinate calculation part may include a first calculation part configured to: determine three-dimensional (3D) camera coordinate values of keypoints of front and rear wheels on first and second sides of the target vehicle, by use of two-dimensional (2D) image coordinate values of the keypoints of the front and rear wheels on the first and second sides of the target vehicle and an inverse matrix of intrinsic and extrinsic parameters of a camera, and determine an angle between an x-axis and a vector connecting a center point of the keypoints of the front and rear wheels on the first and second sides of the target vehicle and a center point of keypoints of the first and second front wheels of the target vehicle. A height of the keypoints of the front and rear wheels on the first and second sides of the target vehicle is set as 0.

The spatial coordinate calculation part may further include a second calculation part configured to: determine unknown values including a distance between first and second bumpers of the target vehicle and the first and second front wheels of the target vehicle, a height of the first and second bumpers from ground, and location values of the first and second bumpers disposed between the first and second front wheels, by use of 3D world coordinate values of the keypoints of the first and second front wheels, 2D image coordinate values of the first and second bumpers, the inverse matrix of the intrinsic and extrinsic parameters of the camera, and the angle, and determine 3D camera coordinate values of the first and second bumpers based on the determined unknown values and 3D camera coordinate values of the keypoints of the first and second front wheels.

The vehicle location calculation apparatus may further include a data generation part configured to set the visible keypoint and the invisible keypoint in the model image.

The data generation part may include: a setting part configured to set a plurality of keypoint locations in the model image; and a labelling part configured to place the modeled vehicle in a 3D synthetic world, project 3D keypoint coordinates of the modeled vehicle onto a plane, confirm the visible keypoint and the invisible keypoint of the modeled vehicle to perform labeling.

According to another aspect of the present disclosure, there is provided a vehicle location calculation method, including: setting a visible keypoint and an invisible keypoint in a model image in which each vehicle is modeled; learning to output the invisible keypoint based on the visible keypoint; and generating a dataset including a visible keypoint and an invisible keypoint of a target vehicle, by inputting the visible keypoint of the target vehicle so that the invisible keypoint of the target vehicle is output. The visible keypoint of the target vehicle is detected in an image of the target vehicle while driving.

The setting may include: setting a plurality of keypoint locations in the model image; placing the modeled vehicle in a 3D synthetic world; projecting 3D keypoint coordinates of the modeled vehicle onto a plane, and confirming the visible keypoint and the invisible keypoint of the modeled vehicle to perform labeling.

The learning may include: correcting the visible keypoint of the modeled vehicle to be similar to a visible keypoint of an image of an actual vehicle; and inputting a value of the correction to output the invisible keypoint of the modeled vehicle.

The generating of the dataset may include learning a visible keypoint in an image of an actual vehicle.

The generating of the dataset may further include detecting the visible keypoint of the target vehicle based on keypoint data obtained by learning the visible keypoint in the image of the actual vehicle.

The vehicle location calculation method may further include determining spatial coordinates of the target vehicle, based on the dataset including the visible keypoint and the invisible keypoint of the target vehicle.

The determining of the spatial coordinates may include: determining 3D camera coordinate values of keypoints of front and rear wheels on first and second sides of the target vehicle, by use of 2D image coordinate values of the keypoints of the front and rear wheels on the first and second sides of the target vehicle and an inverse matrix of intrinsic and extrinsic parameters of a camera, and determining an angle between an x-axis and a vector connecting a center point of the keypoints of the front and rear wheels on the first and second sides of the target vehicle and a center point of keypoints of the first and second front wheels of the target vehicle. A height of the keypoints of the front and rear wheels on the first and second sides of the target vehicle is set as 0.

The determining of the spatial coordinates may further include: determining unknown values including a distance between first and second bumpers of the target vehicle and the first and second front wheels of the target vehicle, a height of the first and second bumpers from ground, and location values of the first and second bumpers disposed between the first and second front wheels, by use of 3D world coordinate values of the keypoints of the first and second front wheels, 2D image coordinate values of the first and second bumpers, the inverse matrix of the intrinsic and extrinsic parameters of the camera, and the angle, and determining 3D camera coordinate values of the first and second bumpers based on the determined unknown values and 3D camera coordinate values of the keypoints of the first and second front wheels.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
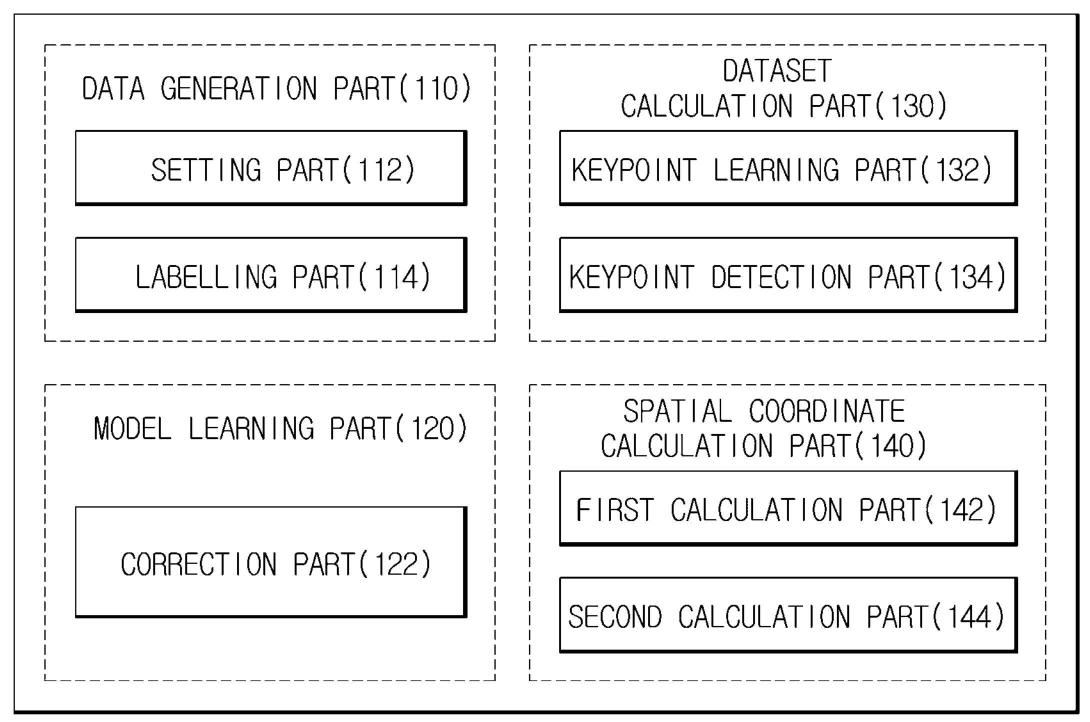
FIG. 1 is a block diagram illustrating constituent components of a vehicle location calculation apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Like reference numerals throughout the specification denote like elements. Also, the present specification does not describe all the elements according to various exemplary embodiments of the present disclosure, and descriptions well-known in the art to which the present disclosure pertains or overlapped portions are omitted.

It will be understood that when an element is referred to as being "connected" to another element, it may be directly or indirectly connected to the other element, wherein the indirect connection includes "connection" via a wireless communication network.

It will be understood that the term "include" when used in the present specification, specifies the presence of stated features, integers, steps, operations, elements, and/or components, but does not preclude the presence or addition of at least one other features, integers, steps, operations, elements, components, and/or groups thereof.

It is to be understood that the singular forms are intended to include the plural forms as well, unless the context clearly dictates otherwise.

The terms such as "~part", "~device", "~block", "~member", "~module", and the like may refer to a unit of processing at least one function or act. For example, the terms may refer to at least process processed by at least one hardware, such as field-programmable gate array (FPGA)/application specific integrated circuit (ASIC), software stored in memories or processors.

Reference numerals used for method steps are just used for convenience of explanation, but not to limit an order of the steps. Thus, unless the context clearly dictates otherwise, the written order may be practiced otherwise.

Hereinafter, various embodiments of the present disclosure will be described in detail with reference to the accompanying drawings.

FIG. 1 is a block diagram illustrating constituent components of a vehicle location calculation apparatus according to an exemplary embodiment of the present disclosure.

Referring to FIG. 1, a vehicle location calculation apparatus 100 according to an exemplary embodiment of the present disclosure includes a data generation part 110, a model learning part 120 and a dataset calculation part 130. Here, the data generation part 110 is configured to set a visible keypoint and an invisible keypoint in a model image in which each vehicle is modeled, and the model learning part 120 is configured to perform learning to output the invisible keypoint based on the visible keypoint set in the data generation part 110. The dataset calculation part 130 is configured to generate a dataset including a visible keypoint and an invisible keypoint of a target vehicle, by inputting the visible keypoint of the target vehicle to the model learning part 120 so that the invisible keypoint of the target vehicle is output. In the present instance, the visible keypoint of the target vehicle is detected in an image of the target vehicle while driving.

Here, the data generation part 110 may include a setting part 112 setting a plurality of keypoint locations in the model image, and a labelling part 114 placing the modeled vehicle in a 3D synthetic world, projecting 3D keypoint coordinates of the modeled vehicle onto a plane, confirming the visible keypoint and the invisible keypoint of the modeled vehicle to perform labeling. Through the labeling operation, the dataset including the visible keypoint and the invisible keypoint of the modeled vehicle is generated.

Also, the model learning part 120 may include a correction part 122 correcting the visible keypoint of the modeled vehicle to be similar to a visible keypoint of an image of an actual vehicle. The model learning part 120 may perform learning to output the invisible keypoint of the modeled vehicle by receiving a correction value obtained by the above correction as input thereof.

The dataset calculation part 130 may include a keypoint learning part 132 learning the visible keypoint in the image of the actual vehicle.

The dataset calculation part 130 may also include a keypoint detection part 134 detecting the visible keypoint of the target vehicle based on data regarding the visible keypoint learned by the keypoint learning part 132.

The vehicle location calculation apparatus 100 may include a spatial coordinate calculation part 140 determining spatial coordinates of the target vehicle, based on the dataset including the visible keypoint and the invisible keypoint of the target vehicle.

The spatial coordinate calculation part 140 may include a first calculation part 142. The first calculation part 142 is configured to determine three-dimensional (3D) camera coordinate values of keypoints of front and rear wheels on both sides of the target vehicle by use of two-dimensional (2D) image coordinate values of the keypoints of the front and rear wheels on both sides of the target vehicle and an inverse matrix of intrinsic and extrinsic parameters of a camera. Also, the first calculation part 142 is configured to determine an angle between an x-axis and a vector connecting a center point of the keypoints of the front and rear wheels on both sides of the target vehicle and a center point of keypoints of both front wheels of the target vehicle. In the present instance, a height of the keypoints of the front and rear wheels on both sides of the target vehicle is set as 0.

Furthermore, the spatial coordinate calculation part 140 may include a second calculation part 144. The second calculation part 144 is configured to determine unknown values including a distance between both bumpers of the target vehicle and both the front wheels of the target vehicle, a height of both the bumpers from ground, and location values of both the bumpers disposed between both the front wheels, by use of 3D world coordinate values of the keypoints of both the front wheels, 2D image coordinate values of both the bumpers, the inverse matrix of the intrinsic and extrinsic parameters of the camera, and the angle. Also, the second calculation part 144 is configured to determine 3D camera coordinate values of both the bumpers based on the determined unknown values and 3D camera coordinate values of the keypoints of both the front wheels.

At least one constituent component of the vehicle location calculation apparatus 100 described above may be provided in the vehicle and used for 3D location calculation. Also, the vehicle location calculation apparatus 100 may include a controller configured for controlling the constituent components of the vehicle location calculation apparatus 100 and means related thereto. The controller may include various types of processors and memories. The memory may store programs, instructions, applications, etc., for control. Each processor may execute the programs, the instructions, the applications, etc., stored in the memory. For example, the controller may include control units such as an electronic control unit (ECU), micro controller unit (MCU), and the like.

The memory may include, for example, a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a Hard Disk Drive (HDD), or a compact disc read only memory (CD-ROM), without being limited thereto. The memory may store, for example, keypoint information, various input/output data, setting values, algorithms, etc., set and determined by the vehicle location calculation apparatus 100.

In an exemplary embodiment of the present invention, the memory and the processor may be provided as one chip, or provided as separate chips.

In an exemplary embodiment of the present invention, the vehicle location calculation apparatus 100 may be implemented by a controller and thus the data generation part 110, the model learning part 120, the dataset calculation part 130 and the spatial coordinate calculation part 140 may be implemented by a controller.

Hereinafter, the constituent components of the vehicle location calculation apparatus 100 are described in detail.

Figure 2:
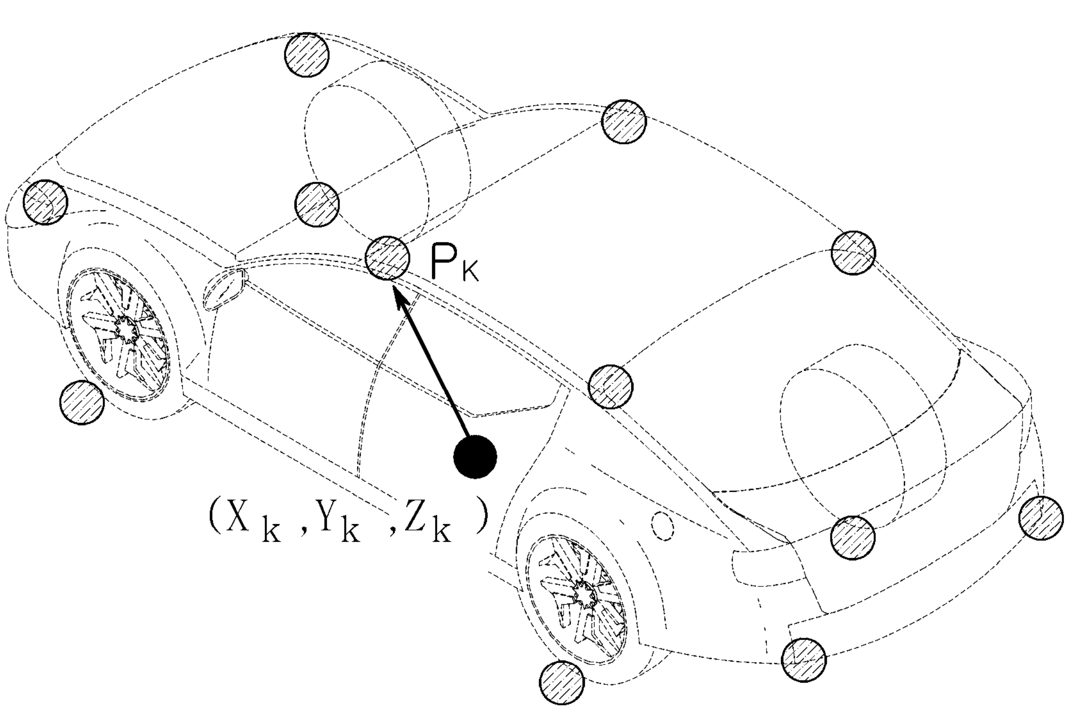
FIG. 2 illustrates an example of setting a plurality of keypoint locations in a model image modelling a vehicle according to an exemplary embodiment of the present disclosure.

FIG. 2 illustrates an example of setting a plurality of keypoint locations in a model image modelling a vehicle according to an exemplary embodiment of the present disclosure.

The data generation part 110 sets a visible keypoint and an invisible keypoint in a model image in which each vehicle is modeled.

Referring to FIG. 2, for example, the setting part 112 may set a plurality of keypoint locations in a computer-aided design (CAD) model image in which each vehicle is modeled. The plurality of set keypoint locations may be expressed in a vector form of 3D world coordinate system based on a center portion of a vehicle. In the present instance, four keypoints of front and rear wheels on both sides corresponding to a ground point of the vehicle are included.

Figure 3:
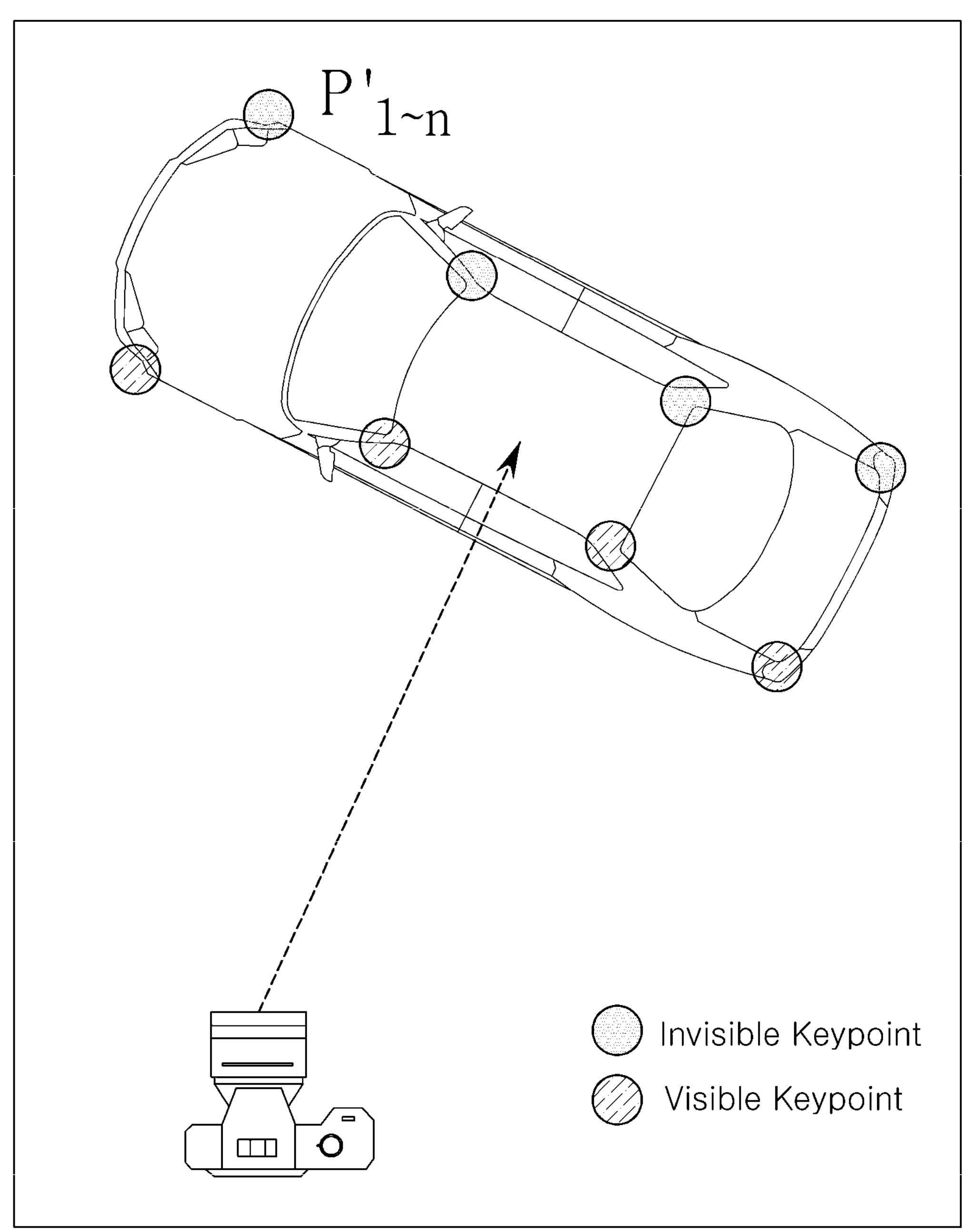
FIG. 3 is a top view exemplarily illustrating that the modeled vehicle of FIG. 2 is placed in a synthetic world.
Figure 4:
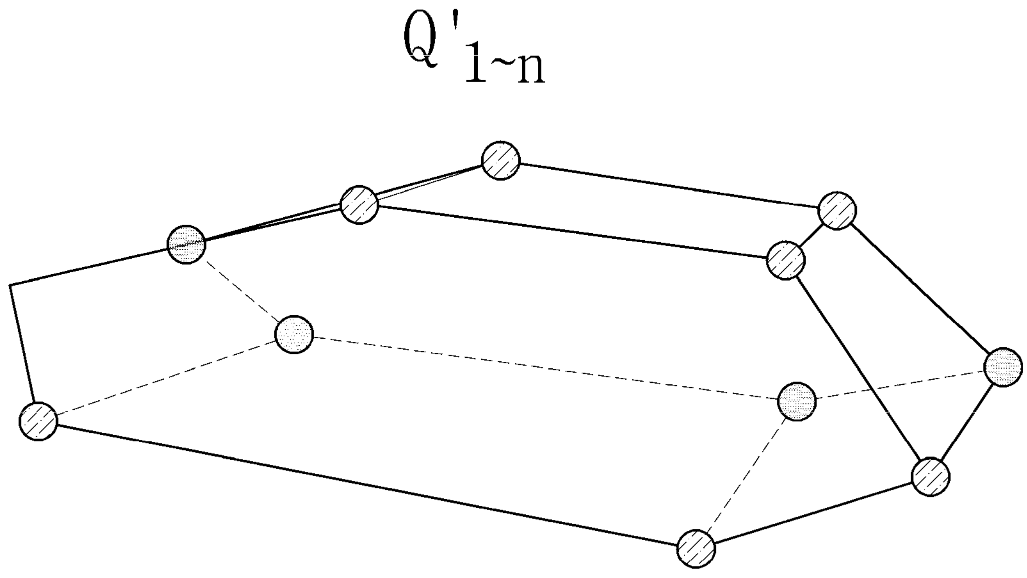
FIG. 4 illustrates the modeled vehicle of FIG. 2 projected onto an image plane.

FIG. 3 is a top view exemplarily illustrating that the modeled vehicle of FIG. 2 is placed in a synthetic world. FIG. 4 illustrates the modeled vehicle of FIG. 2 projected onto an image plane.

Referring to FIG. 3 and FIG. 4, the labelling part 114 is configured to perform labelling by placing a modeled vehicle in a 3D synthetic world, projecting 3D keypoint coordinates of the modeled vehicle onto a plane, and confirming a visible keypoint and an invisible keypoint of the modeled vehicle. Through the labeling operation, a dataset including the visible keypoint and the invisible keypoint of the modeled vehicle is generated.

$$P'_k = \begin{bmatrix} R_{rand} & T_{rand} \\ 0 & 1 \end{bmatrix} \times P_k \quad \text{[Equation 1]}$$

In Equation 1 above, $T_{rand}$ and $R_{rand}$ denote arbitrary translation and rotation matrices in a region of interest (ROI), respectively, and Pk denotes kth keypoint coordinates defined in a model image of the modeled vehicle.

Referring to Equation 1 above, the above-described modeled vehicle may be placed in a 3D synthetic world which is based on a world coordinate system, and be randomly moved and rotated according to an extrinsic parameter matrix of a camera. Accordingly, by identifying a degree of movement and rotation of the camera in the world coordinate system of the 3D synthetic world, a positional change on a camera coordinate system may be identified.

The modeled vehicle placed in the synthetic world may be projected onto an image plane according to a camera model, i.e., an intrinsic parameter matrix of the camera. Hereinafter, the camera intrinsic and extrinsic parameters are defined and referred to as world to image (W2I) for convenience.

A randomly placed world coordinate value of kth keypoint is projected onto the image plane by a functional relationship of $$Q'_k = W2I(P'_k).$$

For example, a 3D world coordinate value $$P'_{1\sim n}$$

of FIG. 3 is converted into a camera coordinate value according to the W2I matrix, and then projected onto the image plane as shown in FIG. 4, and thus a 2D image coordinate value $$Q'_{1\sim n}$$

is generated.

Also, keypoints of the vehicle projected onto the image plane are individually labeled as visible and invisible keypoints.

The above-described labeling operation of placing the modeled vehicle in the 3D synthetic world, projecting the 3D keypoint coordinates of the modeled vehicle onto the plane, and confirming the visible keypoint and the invisible keypoint of the modeled vehicle may be performed N times for each vehicle model (defined as m). Through the above, the m*N number of dataset including visible keypoints and invisible keypoints of each modeled vehicle are generated.

The model learning part 120 is configured to perform learning to output the invisible keypoint, based on the visible keypoint set in the data generation part 110.

The model learning part 120 may include the correction part 122 correcting the visible keypoint of the modeled vehicle to be similar to a visible keypoint of an image of an actual vehicle. The model learning part 120 may perform learning to output the invisible keypoint of the modeled vehicle by receiving the above correction value.

$$\widehat{u_k}, \widehat{v_k} = Q'_k + N\left(0, \operatorname{int}\left(\frac{norm(P'_k)}{\sigma}\right)\right) \text{ if } rand() > p \quad \text{[Equation 2]}$$

0,0 if rand( )≤p or $$Q'_k$$

is not visible

Here, $u_k$, $v_k$ denote image coordinate values and $\widehat{u_k}$, $\widehat{v_k}$ denote correction values of the $u_k$, $v_k$.

Referring to Equation 2 above, with respect to coordinates of kth visible keypoint of the modeled vehicle $$Q'_k = (u_k, v_k),$$

the corresponding keypoint is dropped according to a probability P. The probability P is a probability that a keypoint corresponding to the visible keypoint of the image of the actual vehicle does not exist in the image of the modeled vehicle.

Also, location coordinates of each visible keypoint of the modeled vehicle are changed according to a Gaussian probability distribution $$\frac{norm(P'_k)}{\sigma}$$

based on a distance value, wherein the σ is standard deviation. The above process is performed to adjust a keypoint location of the modeled vehicle to be similar to a location of the visible keypoint of the actual vehicle, because the location of the visible keypoint of the actual vehicle and the keypoint location of the modeled vehicle may not be completely matched.

Furthermore, when a preset condition of if rand( )≤p or $$Q_k'$$

is not visible is met, being set as 0,0 is for lowering a probability of being identified as an invisible keypoint in the modeled vehicle, even though a keypoint of the actual vehicle is a visible keypoint, below a set reference probability.

Figure 5:
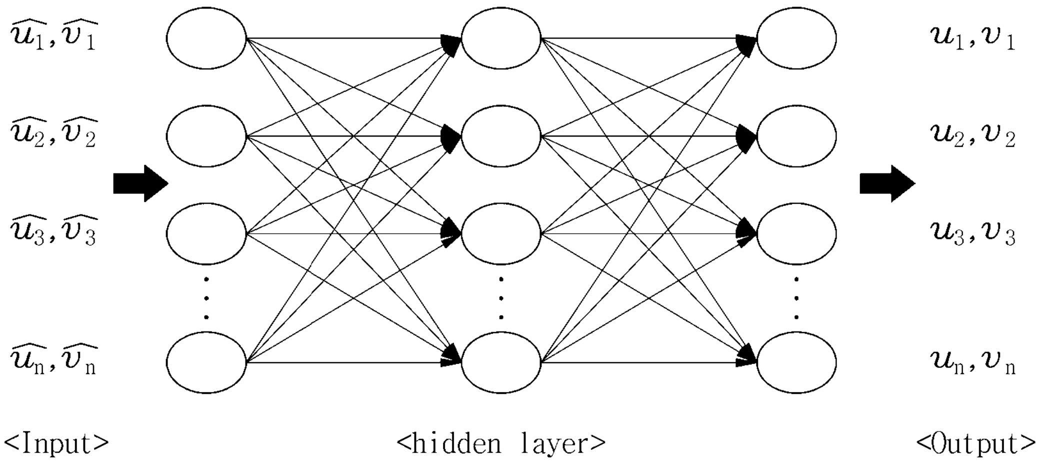
FIG. 5 is a conceptual diagram illustrating learning to output invisible keypoints based on visible keypoints according to an exemplary embodiment of the present disclosure.

FIG. 5 is a conceptual diagram illustrating learning to output invisible keypoints based on visible keypoints according to an exemplary embodiment of the present disclosure.

Referring to FIG. 5, learning is performed so that a correction value $\widehat{u_k}, \widehat{v_k}$ obtained by correcting a visible keypoint of a modeled vehicle described above is input to the model learning part 120 as an input value and an invisible keypoint generated in the data generation part 110 is output.

For example, the model learning part 120 may include a multilayer perceptron (MLP) including a plurality of hidden layers, and each of the hidden layers may include a known linear, BatchNorm, ReLu structure.

When the above-described value $\widehat{u_k}, \widehat{v_k}$ is input to the model learning part 120 as an input value, an invisible keypoint corresponding to the corresponding input value is output, and thus a full keypoint dataset $u_k$, $v_k$ including the visible keypoint and the invisible keypoint is generated.

The dataset calculation part 130 generates a dataset including a visible keypoint and an invisible keypoint of a target vehicle, by inputting the visible keypoint of the target vehicle to the model learning part 120 so that the invisible keypoint of the target vehicle is output. Here, the visible keypoint of the target vehicle is detected in an image of the target vehicle while driving. The generated visible keypoint and invisible keypoint of the target vehicle is in a form of 2D image coordinate values. The dataset calculation part 130 includes the keypoint learning part 132 and the keypoint detection part 134.

The keypoint learning part 132 learns a visible keypoint in an image of an actual vehicle. In the present instance, labelling on the visible keypoint in the image of the actual vehicle and deep learning-based learning may be performed.

The keypoint detection part 134 detects the visible keypoint in the image of the target vehicle while driving, based on data regarding the visible keypoint learned by the keypoint learning part 132. For example, the keypoint detection part 134 may recognize a keypoint using a morphological characteristics of the target vehicle.

Keypoint information recognized by the keypoint detection part 134 may include a keypoint location in an image, information related to a portion of an object indicated by each keypoint, and image pixel values.

The spatial coordinate calculation part 140 is configured to determine spatial coordinates of the target vehicle, based on the above-described dataset including the visible keypoint and the invisible keypoint of the target vehicle. The spatial coordinate calculation part 140 includes the first calculation part 142 and the second calculation part 144.

Figure 6:
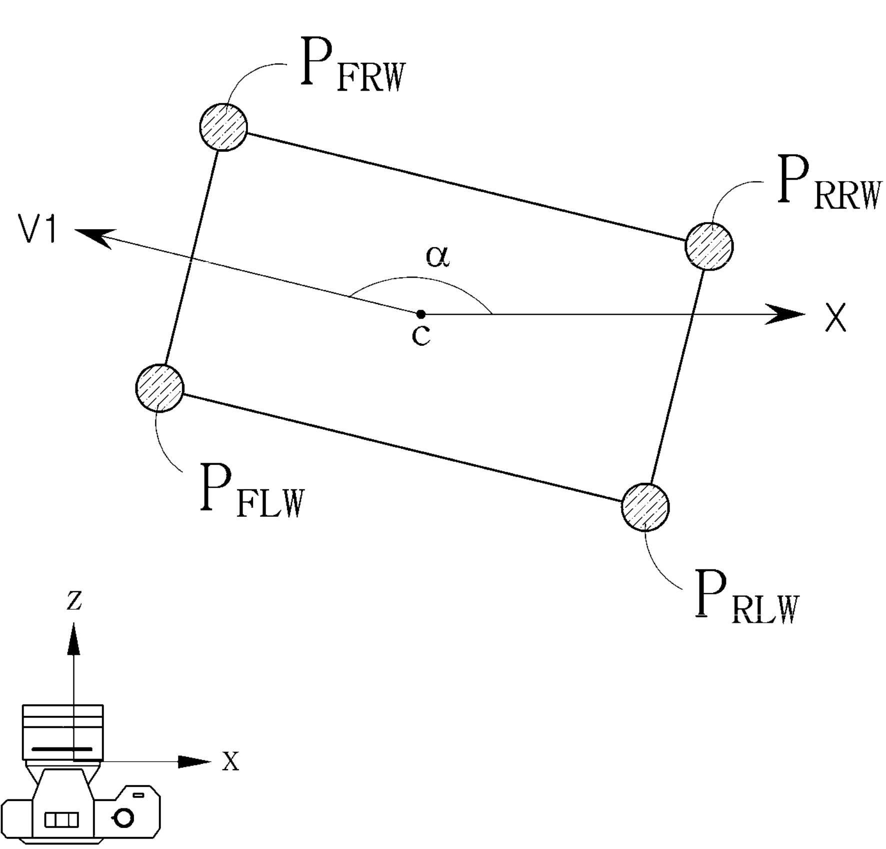
FIG. 6 illustrates keypoints of front and rear wheels on both sides of a target vehicle according to an exemplary embodiment of the present disclosure.
Figure 7:
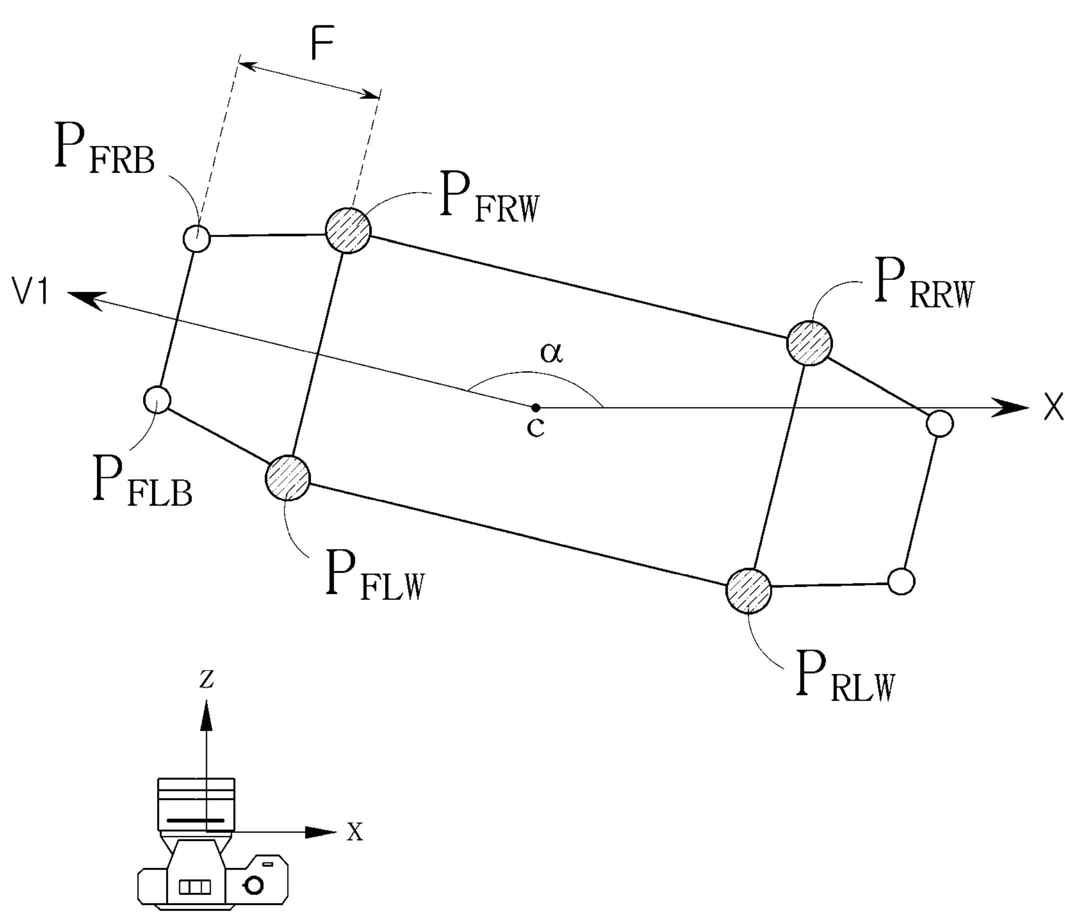
FIG. 7 illustrates keypoints of both bumpers in front of keypoints of both front wheels of FIG. 6.

FIG. 6 illustrates keypoints of front and rear wheels on both sides of a target vehicle according to an exemplary embodiment of the present disclosure. FIG. 7 illustrates keypoints of both bumpers in front of keypoints of both front wheels of FIG. 6.

Referring to FIG. 6, because image coordinate values $u_k$, $v_k$ of a visible keypoint and an invisible keypoint of a target vehicle 101 is already known through the dataset calculation part 130, keypoints $P_{FLW}$, $P_{FRW}$, $P_{RLW}$, $P_{RRW}$ representing front left wheel, front right wheel, rear left wheel, and rear right wheel of the target vehicle 101 may be shown in a camera coordinate system.

Here, a rectangle shape is generated by connecting keypoints of the front and rear wheels of the target vehicle 101, a moving direction of the target vehicle 101 may be shown through a vector V1 connecting a center point of the target vehicle 101 and a center point of keypoints $P_{FLW}$, $P_{FRW}$ of both front wheels of the target vehicle 101, and an angle α between the vector V1 and an x-axis may be identified.

$$\begin{bmatrix} U_{FRW} \\ V_{FRW} \\ d \end{bmatrix} = W2I * \begin{bmatrix} X_{FRW} \\ 0 \\ Z_{FRW} \end{bmatrix} \quad \text{[Equation 3]}$$

In Equation 3 above, keypoints of the front and rear wheels of the target vehicle 101 are ground contact points. Because a reference height (y=0) of a camera coordinate system is already known, 3D world coordinate values ($X_{FRW}$, $Z_{FRW}$) of a front right wheel's keypoint of the target vehicle 101 may be determined by use of image coordinate values ($U_{FRW}$, $V_{FRW}$) of the front right wheel's keypoint of the target vehicle 101 and an inverse matrix (1/W2I) of intrinsic and extrinsic parameters of camera.

Here, the image coordinate values ($U_{FRW}$, $V_{FRW}$) of the front right wheel's keypoint of the target vehicle 101 are invisible keypoints which are known values generated by the dataset calculation part 130.

Accordingly, by use of 2D image coordinate values of both rear wheels' keypoints of the target vehicle 101 and the inverse matrix of intrinsic and extrinsic parameters of camera, the first calculation part 142 may be configured to determine 3D world coordinate values of both rear wheels' keypoints of the target vehicle 101. In the present instance, a height of both the rear wheels' keypoints is set as 0.

Next, to determine 3D camera coordinate values ($P_{FLB}$, $P_{FRB}$) of both bumpers of the target vehicle 101, determined are unknown values including a distance F among both the bumpers and both the front wheels of the target vehicle 101, a height h of both the bumpers from ground, and location values l of both the bumpers disposed between both the front wheels.

The second calculation part 144 is configured to determine the unknown values including the distance F among both the bumpers and both the front wheels of the target vehicle, the height h of both the bumpers from ground, and the location values l of both the bumpers disposed between both the front wheels, by use of 3D world coordinate values ($X_{FRW}$, $Z_{FRW}$, $X_{FLW}$, $Z_{FLW}$) of the keypoints of both the front wheels, 2D image coordinate values ($U_{FRB}$, $V_{FRB}$, $U_{FLB}$, $V_{FLB}$) of both the bumpers, the inverse matrix W2I of the intrinsic and extrinsic parameters of the camera, and the angle α. The angle α is an angle between the X axis and vector V1. The second calculation part 144 also is configured to determine 3D camera coordinate values ($P_{FRB}$, $P_{FLB}$) of both the bumpers based on the determined unknown values and 3D camera coordinate values ($P_{FRW}$, $P_{FLW}$) of the keypoints of both the front wheels.

$$P_{FRB} = P_{FRW} + \begin{bmatrix} F\cos(\alpha) - l\sin(\alpha) \\ h \\ F\sin(\alpha) + l\cos(\alpha) \end{bmatrix} \quad \text{[Equation 4]}$$

Equation 4 shown above is for determining the 3D camera coordinate value ($P_{FRB}$) of a front right bumper of the target vehicle 101.

$$P_{FLB} = P_{FLW} + \begin{bmatrix} F\cos(\alpha) + l\sin(\alpha) \\ h \\ F\sin(\alpha) - l\cos(\alpha) \end{bmatrix} \quad \text{[Equation 5]}$$

Equation 5 shown above is for determining the 3D camera coordinate value ($P_{FLB}$) of a front left bumper of the target vehicle 101.

In Equation 4 and Equation 5 above, because the 3D camera coordinate values ($P_{FRW}$, $P_{FLW}$) of both the front wheels' keypoints are already known, the 3D camera coordinate values ($P_{FLB}$, $P_{FRB}$) of both the bumpers may be determined by substituting the unknown values.

$$\begin{bmatrix} U_{FRB} \\ V_{FRB} \\ d \end{bmatrix} = W2I * \left( \begin{bmatrix} X_{FRW} + \boxed{F\cos(\alpha) - l\sin(\alpha)} \\ \boxed{h} \\ Z_{FRW} + \boxed{F\sin(\alpha) + l\cos(\alpha)} \end{bmatrix} \right) \quad \text{[Equation 6]}$$

$$\begin{bmatrix} U_{FLB} \\ V_{FLB} \\ d \end{bmatrix} = W2I * \left( \begin{bmatrix} X_{FLW} + \boxed{F\cos(\alpha) + l\sin(\alpha)} \\ \boxed{h} \\ Z_{FLW} + \boxed{F\sin(\alpha) - l\cos(\alpha)} \end{bmatrix} \right) \quad \text{[Equation 7]}$$

In Equation 6 and Equation 7 above, boxes marked with rectangular lines indicate a distance between the keypoints of both the bumpers and the keypoints of both the front wheels of the target vehicle 101 as the unknown values (F, h,l). The image coordinate values ($U_{FRB}$, $V_{FRB}$) of the front right bumper's keypoint and the image coordinate values ($U_{FLB}$, $V_{FLB}$) of the front left bumper's keypoint of the target vehicle 101 are already known values generated in the dataset calculation part 130.

Also, the 3D camera coordinate values ($X_{FRW}$, $Z_{FRW}$) of the front right wheel's keypoint and the 3D camera coordinate values ($X_{FLW}$, $Z_{FLW}$) of the front left wheel's keypoint of the target vehicle 101 may be determined by Equation 3 above.

Accordingly, because the above-described unknown values (F, h, l) may be obtained by Equation 6 and Equation 7, the 3D camera coordinate values ($P_{FRB}$, $P_{FLB}$) of both the bumpers may be determined by substituting the unknown values to Equation 4 and Equation 5.

Figure 8:
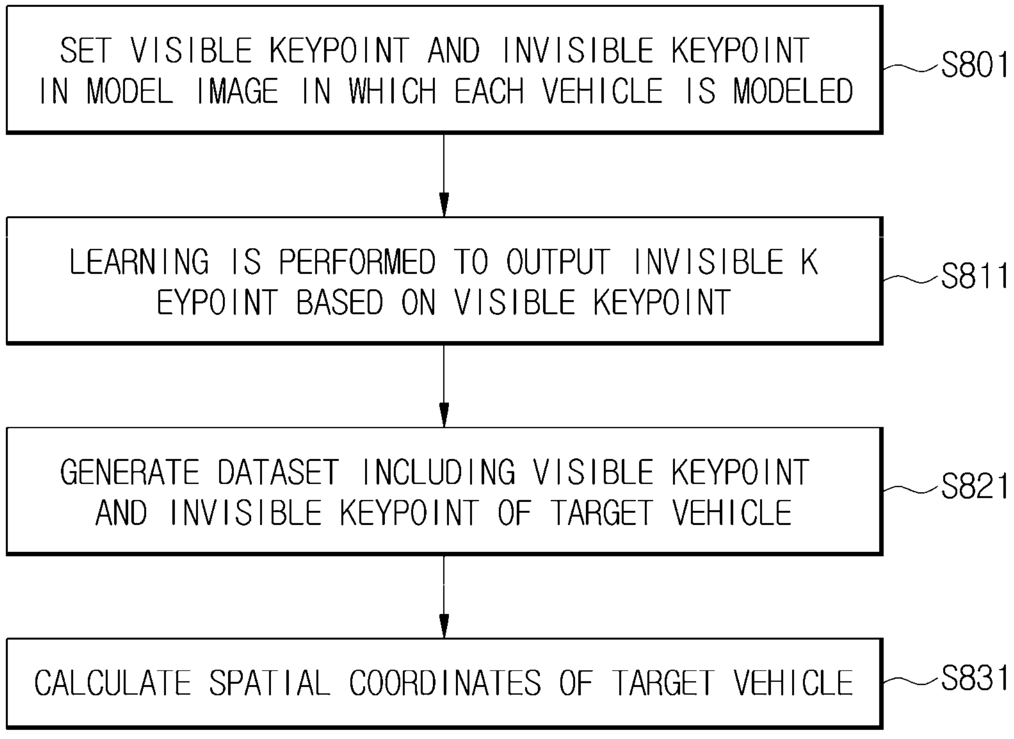
FIG. 8 is a flowchart illustrating a vehicle location calculation method using the vehicle location calculation apparatus of FIG. 1.

FIG. 8 is a flowchart illustrating a vehicle location calculation method using the vehicle location calculation apparatus of FIG. 1. Hereinafter, the description that has been made above is omitted to avoid duplication.

First, a visible keypoint and an invisible keypoint are set in a model image in which each vehicle is modeled (S801).

In operation S801, the data generation part 110 sets a plurality of keypoint locations in the model image in which each vehicle is modeled, and labelling is performed by placing the modeled vehicle in a 3D synthetic world, projecting 3D keypoint coordinates of the modeled vehicle onto a plane and confirming the visible keypoint and the invisible keypoint of the modeled vehicle.

Next, learning is performed to output the invisible keypoint based on the visible keypoint (S811).

In operation S811, learning is performed in the model learning part 120 to correct the visible keypoint of the modeled vehicle to be similar to a visible keypoint of an image of an actual vehicle, and output the invisible keypoint of the modeled vehicle by receiving the correction value as input thereof.

Afterwards, a dataset including a visible keypoint and an invisible keypoint of a target vehicle is generated (S821).

In operation S821, the keypoint learning part 132 learns a visible keypoint in an image of an actual vehicle, and the keypoint detection part 134 detects the visible keypoint of the target vehicle based on data regarding the visible keypoint learned by the keypoint learning part 132.

Next, spatial coordinates of the target vehicle is determined based on the dataset including the visible keypoint and the invisible keypoint of the target vehicle (S831).

In operation S831, an operation of determining 3D world coordinate values of both rear wheels' keypoints of the target vehicle by use of 2D image coordinate values of both the rear wheels' keypoints of the target vehicle and an inverse matrix of intrinsic and extrinsic parameters of camera, may be included. In the present instance, a height of both the rear wheels' keypoints of the target vehicle is set as 0.

Also, in operation S831, two operations described below may be included. That is, an operation of determining unknown values including a distance F among both the bumpers and both the front wheels of the target vehicle, a height h of both the bumpers from ground, and location values l of both the bumpers disposed between both the front wheels, by use of 3D world coordinate values ($X_{FRW}$, $Z_{FRW}$, $X_{FLW}$, $Z_{FLW}$) of the keypoints of both the front wheels, 2D image coordinate values ($U_{FRB}$, VERB, $U_{FLB}$, $V_{FLB}$) of both the bumpers, the inverse matrix W2I of the intrinsic and extrinsic parameters of the camera, and an angle $\alpha$, and also an operation of determining 3D camera coordinate values ($P_{FRB}$, $P_{FLB}$) of both the bumpers based on the determined unknown values and 3D camera coordinate values ($P_{FRW}$, $P_{FLW}$) of both the front wheels' keypoints, may be included.

As is apparent from the above, according to the exemplary embodiments of the present disclosure, the vehicle location calculation apparatus and the vehicle location calculation method can effectively recognize a location of a vehicle by predicting invisible keypoints using visible keypoints of the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless particularly stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle location calculation apparatus, comprising:

at least one processor; and at least one memory operably coupled with the at least one processor and storing instructions that, when executed by the at least one processor, cause the at least one processor to perform operations comprising:

performing learning of a model to output an invisible keypoint set in a model image in which each vehicle is modeled, based on a visible keypoint set in the model image; and generating a dataset including a visible keypoint and an invisible keypoint of a target vehicle, by inputting the visible keypoint of the target vehicle to the model so that the invisible keypoint of the target vehicle is output, the visible keypoint of the target vehicle being detected in an image of the target vehicle while driving, wherein the performing learning of the model comprises:

changing coordinate values of the visible keypoint of the modeled vehicle based on coordinate values of a visible keypoint of an image of an actual vehicle; and inputting the changed coordinate values of the visible keypoint as training data into the model, wherein the model is trained to output coordinate values of the invisible keypoint of the modeled vehicle by using the changed coordinate values as an input.

2. The vehicle location calculation apparatus of claim 1, wherein the coordinate values of the visible keypoint of the modeled vehicle are adjusted based on a Gaussian probability distribution according to distance to match the coordinate values of a corresponding visible keypoint in the actual vehicle image.

3. The vehicle location calculation apparatus of claim 1, wherein the performing learning of the model comprises performing learning of the visible keypoint in the image of the actual vehicle.

4. The vehicle location calculation apparatus of claim 3, wherein the operations further comprise detecting the visible keypoint of the target vehicle based on data regarding the visible keypoint learned by a keypoint learning part.

5. The vehicle location calculation apparatus of claim 1, wherein the operations further comprise determining spatial coordinates of the target vehicle, based on the dataset including the visible keypoint and the invisible keypoint of the target vehicle.

6. The vehicle location calculation apparatus of claim 5, wherein determining the spatial coordinates of the target vehicle comprises:

determining three-dimensional (3D) camera coordinate values of keypoints of front and rear wheels on first and second sides of the target vehicle, by use of two-dimensional (2D) image coordinate values of the keypoints of the front and rear wheels on the first and second sides of the target vehicle and an inverse matrix of intrinsic and extrinsic parameters of a camera, a height of the keypoints of the front and rear wheels on the first and second sides of the target vehicle being set as 0; and determining an angle between an x-axis and a vector connecting a center point of the keypoints of the front and rear wheels on the first and second sides of the target vehicle and a center point of keypoints of the first and second front wheels of the target vehicle.

7. The vehicle location calculation apparatus of claim 6, wherein determining the spatial coordinates of the target vehicle comprises:

determining unknown values including a distance between first and second bumpers of the target vehicle and the first and second front wheels of the target vehicle, a height of the first and second bumpers from ground, and location values of the first and second bumpers disposed between the first and second front wheels, by use of 3D world coordinate values of the keypoints of the first and second front wheels, 2D image coordinate values of the first and second bumpers, the inverse matrix of the intrinsic and extrinsic parameters of the camera, and the angle, and determining 3D camera coordinate values of the first and second bumpers based on the determined unknown values and 3D camera coordinate values of the keypoints of the first and second front wheels.

8. The vehicle location calculation apparatus of claim 1, wherein the operations further comprise setting the visible keypoint and the invisible keypoint in the model image.

9. The vehicle location calculation apparatus of claim 8, wherein the operations further comprise:

placing the modeled vehicle in a 3D synthetic world;

projecting 3D keypoint coordinates of the modeled vehicle onto a plane; and confirming the visible keypoint and the invisible keypoint of the modeled vehicle to perform labeling.

10. A vehicle location calculation method, comprising:

setting, by a controller, a visible keypoint and an invisible keypoint in a model image in which each vehicle is modeled;

performing, by the controller, learning of a model to output the invisible keypoint based on the visible keypoint; and generating, by the controller, a dataset including a visible keypoint and an invisible keypoint of a target vehicle, by inputting the visible keypoint of the target vehicle to the model so that the invisible keypoint of the target vehicle is output, the visible keypoint of the target vehicle being detected in an image of the target vehicle while driving, wherein the performing learning of the model comprises:

changing coordinate values of the visible keypoint of the modeled vehicle based on coordinate values of a visible keypoint of an image of an actual vehicle; and inputting the changed coordinate values of the visible keypoint as training data into the model, wherein the model is trained to output coordinate values of the invisible keypoint of the modeled vehicle by using the changed coordinate values as an input.

11. The vehicle location calculation method of claim 10, wherein the setting includes:

setting a plurality of keypoint locations in the model image;

placing the modeled vehicle in a 3D synthetic world;

projecting 3D keypoint coordinates of the modeled vehicle onto a plane; and confirming the visible keypoint and the invisible keypoint of the modeled vehicle to perform labeling.

12. The vehicle location calculation method of claim 10, wherein the coordinate values of the visible keypoint of the modeled vehicle are adjusted based on a Gaussian probability distribution according to distance to match the coordinate values of a corresponding visible keypoint in the actual vehicle image.

13. The vehicle location calculation method of claim 10, wherein the generating of the dataset includes learning the visible keypoint in the image of the actual vehicle.

14. The vehicle location calculation method of claim 13, wherein the generating of the dataset further includes detecting the visible keypoint of the target vehicle based on data regarding the learned visible keypoint.

15. The vehicle location calculation method of claim 10, further including:

determining spatial coordinates of the target vehicle, based on the dataset including the visible keypoint and the invisible keypoint of the target vehicle.

16. The vehicle location calculation method of claim 15, wherein the determining of the spatial coordinates includes:

determining 3D camera coordinate values of keypoints of front and rear wheels on first and second sides of the target vehicle, by use of 2D image coordinate values of the keypoints of the front and rear wheels on the first and second sides of the target vehicle and an inverse matrix of intrinsic and extrinsic parameters of a camera, a height of the keypoints of the front and rear wheels on the first and second sides of the target vehicle being set as 0; and determining an angle between an x-axis and a vector connecting a center point of the keypoints of the front and rear wheels on the first and second sides of the target vehicle and a center point of keypoints of the first and second front wheels of the target vehicle.

17. The vehicle location calculation method of claim 16, wherein the determining of the spatial coordinates further includes:

determining unknown values including a distance between first and second bumpers of the target vehicle and the first and second front wheels of the target vehicle, a height of the first and second bumpers from ground, and location values of the first and second bumpers disposed between the first and second front wheels, by use of 3D world coordinate values of the keypoints of the first and second front wheels, 2D image coordinate values of the first and second bumpers, the inverse matrix of the intrinsic and extrinsic parameters of the camera, and the angle; and determining 3D camera coordinate values of the first and second bumpers based on the determined unknown values and 3D camera coordinate values of the keypoints of the first and second front wheels.

18. The vehicle location calculation method of claim 10, wherein the controller includes:

a processor; and a non-transitory storage medium on which a program for performing the vehicle location calculation method of claim 10 and for being executed by the processor is recorded.

* * * * *